3,050,165
SYSTEM FOR AUTOMATICALLY NEUTRALIZING A VEHICLE TRANSMISSION UPON APPLICATION OF BRAKES

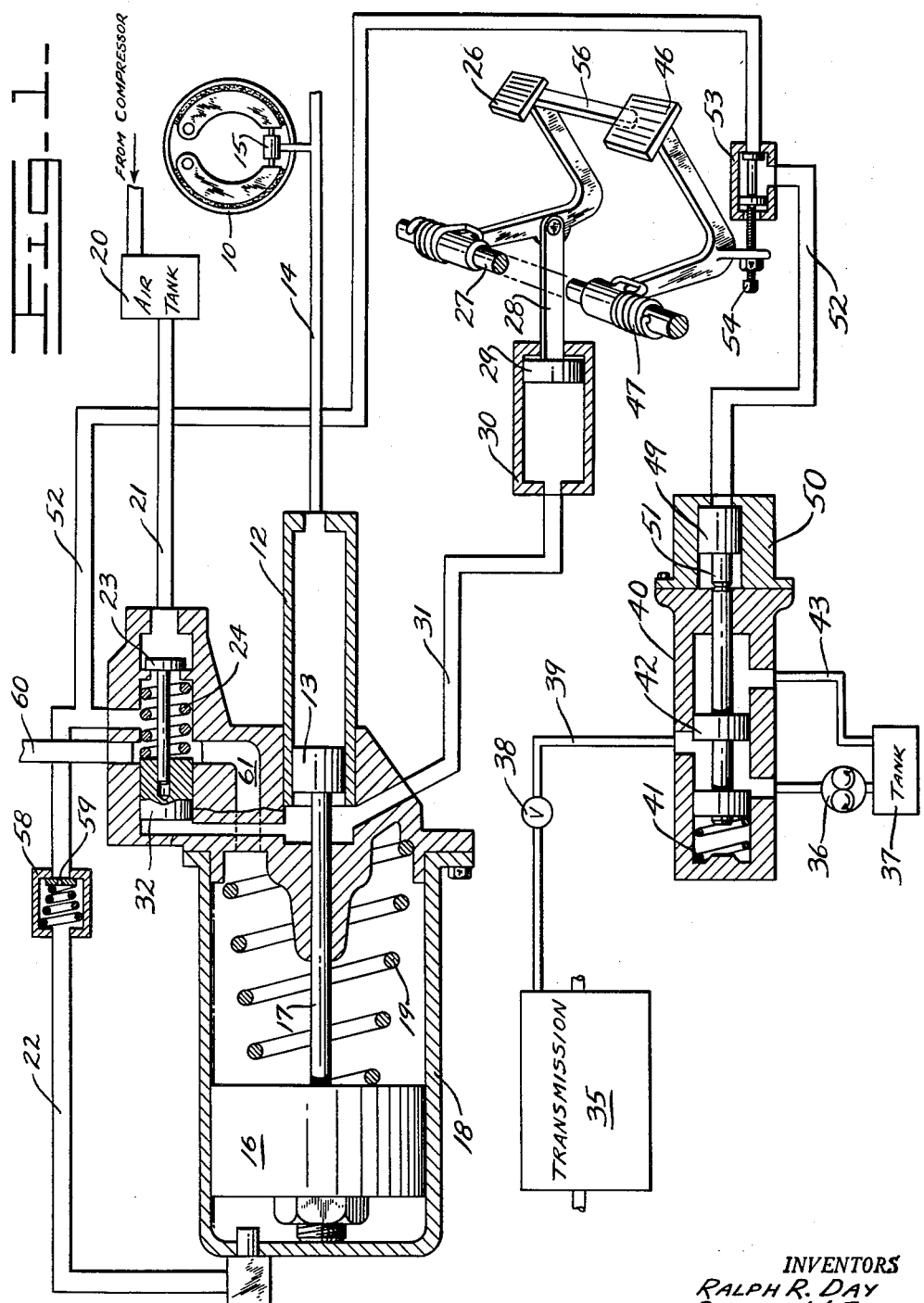
INVENTORS
RALPH R. DAY
RAYMOND W. FABERE
BY
*Fryer and Johnson*
ATTORNEYS

Ralph R. Day, Aurora, and Raymond W. Fabere, Naperville, Ill., assignors to Caterpillar Tractor Co., Peoria, Ill., a corporation of California
Filed Aug. 26, 1959, Ser. No. 836,190
5 Claims. (Cl. 192—13)

This invention relates to means employed on a vehicle for effecting automatic disengagement of the transmission or main clutch when desired upon application of the vehicle brakes as well as reengagement of the transmission when the brakes are released.

The invention is particularly applicable to loaders of the type in which an engine employed to power the vehicle for movement from place to place is also employed to provide power often through hydraulic pumps to raise and manipulate a bucket, fork or other material handling device carried by the vehicle. It has been recognized as desirable to employ a connection between the brake pedal of a loader and its transmission to neutralize the transmission automatically upon actuation of the brakes. This has the advantage of freeing the hands of the operator to manipulate the bucket controls, instead of actuating a transmission or clutch lever first, and also insures availability of the full power of the engine for manipulating the bucket without delay.

A disadvantage of existing devices designed for this purpose is that a brief period occurs in which the clutch or transmission is neutralized before the brakes are fully applied. This results in difficulty in properly positioning the vehicle and in a dangerous situation particularly during operation on a slope because the vehicle is momentarily able to coast.

It is the object of the present invention to provide a simple system for neutralizing the transmission of a vehicle upon application of its brakes in which the above mentioned disadvantages are overcome, to provide such a system in which comparatively little change is necessary to standard brake and transmission systems and one in which dual brake pedals are operable selectively in the event it is desired to apply the brakes without neutralizing the transmission.

Further objects and advantages of the invention are made apparent in the following specification wherein the invention is described in detail by reference to the accompanying drawing.

The drawing is a schematic view of the major portions of a system embodying the invention illustrating the hydraulic and pneumatic circuits employed. The system of the present invention utilizes a conventional hydraulic pneumatic brake mechanism with very slight modification thereto. This brake mechanism is shown as adapted to actuate the brakes of a vehicle, one of which is schematically shown at 10, in the following manner. A master cylinder 12 with a piston 13 reciprocable therein is employed in a closed circuit to direct hydraulic fluid under pressure through a line as indicated at 14 to a brake cylinder 15 for applying the brake and other similar brakes which may be included in the circuit.

The piston 13 is advanced in the cylinder 12 by means of a large piston 16 connected thereto as by a rod 17 and reciprocably mounted in an air cylinder 18. A spring 19 normally holds the piston in its retracted position in which the brakes are released. The brakes are applied by admitting air from a tank 20 in which pressure is maintained by a conventional compressor not shown. Air from the tank 20 passes through a line 21 and a line 22 to the head end of the air cylinder 18 for applying the brake and a valve 23 between these lines is normally closed as by a spring 24. The valve 23 is opened by a closed hydraulic circuit which is actuated by a brake pedal 26 pivotally mounted on a shaft 27. This brake pedal is connected with the rod 28 of a piston 29 in a hydraulic cylinder 30 so that upon depression of the brake pedal, the piston 29 is advanced to exert hydraulic pressure through a line 31 and through suitable passages which communicate with the head end of a piston 32 connected with the valve 23. Thus upon depression of the brake pedal 26, the valve 23 is opened and air is admitted through the line 22 to effect application of the brakes in the manner above described all in accordance with conventional practice.

A vehicle transmission is schematically illustrated at 35 and may be any one of various types of hydraulically actuated transmissions in which one or more clutches are employed for completing the power train between the engine of the vehicle and its drive wheels and the clutch or clutches are of the type which are held in engaged position by hydraulic pressure supplied as by a pump 36 which withdraws fluid from a tank 37. A control valve normally employed for engaging and disengaging the transmission clutch is schematically illustrated at 38 in a line 39 which communicates between the pump and the transmission. The present invention provides a valve of the spool type illustrated at 40 normally held in the open position shown as by a spring 41. When it is desired to relieve the pressure which holds the transmission clutch in engagement, a spool 42 in the valve 40 is moved to the left against the pressure of the spring 41 to interrupt the flow of pressure into the line 39 and provide communication with a line 43 which relieves the pressure in the line 39 to the tank.

A secondary brake pedal 46 also pivotally mounted on the shaft 27 and normally held in its raised position by a spring 47 is operable both to apply the brakes and to actuate the spool valve 40 for releasing the clutch or neutralizing the transmission. The valve 40 is actuated by air pressure applied to a piston 49 in a cylinder 50 which is coaxial with the valve spool cylinder and the piston 49 has a stem 51 engageable with the valve spool stem for moving it to the left as previously described. Air under pressure may be communicated to the cylinder 50 by a line 52 which communicates with the line 22 previously described and includes a normally closed valve 53. The valve 53 is held in its closed position by an adjustable screw 54 carried by the brake pedal 46 and held against the valve by the tension of the spring 47 which holds the pedal in its raised position.

The brake pedal 26 carries a laterally extending arm 56, the end of which underlies the brake pedal 46 so that depression of the pedal 46 effects simultaneous depression of the pedal 26. This permits the brake pedal 26 to be depressed for application of the brakes without affecting the transmission as is sometimes required in the operation of the vehicle. When the secondary brake pedal 46 is depressed, the brakes are applied, charging the line 22 with air under pressure and directing pressure through the communicating line 52 to the valve 53 which is permitted to open by retraction of the screw 54 away from its valve element. The pressure is then communicated to the piston 49 through which it actuates the spool valve and permits release of the clutch in the transmission 35.

During the operation just described, the spring 41 in the spool valve retards the motion of the spool sufficiently to insure that the brakes are fully applied before the clutch is released.

The invention also provides means to insure that the clutch is engaged before the brake is released after release of the pedal 46. This is accomplished by a spring closed check valve 58 in the line 22, the valve element of which has a restricted orifice 59 formed therein. Upon application of the brakes, air pressure in the line 22 opens the valve 58 but when pressure of the brake cylinder 18 is discontinued as by closing the valve 23, the air in the cylinder is released gradually through the restricted orifice 59 under influence of the spring 19 which causes retraction of the piston 16. The delay caused by the passage of air through the restricted orifice is sufficient to insure reenegagement of the transmission clutch just prior to release of the brakes. This engagement of the clutch is at the same time hastened by the action of the spring 41 which moves the spool 42 toward the right to reestablish communication of the pump 36 with the transmission.

The air escaping through the restricted orifice 59 flows into the spring chamber of the valve 23 and thence out through an exhaust line 60. A passage 61 also communicates with the exhaust 60 and the rod end of the air cylinder 18 through the chamber of spring 24 to prevent the piston 16 from becoming air locked during its reciprocal motion.

We claim:

1. In a vehicle which has air actuated brakes and a hydraulically actuated power transmission clutch, means including a brake pedal for controlling a supply of air under pressure to the brakes, a hydraulic circuit including a normally open valve for supplying hydraulic fluid to engage the clutch, air actuated means in communication with said supply of air under pressure to close said valve and effect disengagement of the clutch, an air valve controlling the supply to said normally open valve, a secondary brake pedal normally holding said air valve closed and permitting it to open upon depression of the secondary pedal, and means to effect depression of said first named pedal with the secondary pedal to cause release of the clutch and application of the brake.

2. In a vehicle which has air actuated brakes and a hydraulically actuated power transmission clutch, means including a brake pedal for controlling a supply of air under pressure to the brakes, a hydraulic circuit including a normally open valve for supplying hydraulic fluid to engage the clutch, air actuated means in communication with said supply of air under pressure to close said valve and effect disengagement of the clutch, an air valve controlling the supply to said normally open valve, a secondary brake pedal normally holding said air valve closed and permitting it to open upon depression of the secondary pedal, means to effect depression of said first named pedal with the secondary pedal to cause release of the clutch and application of the brake, and spring means to resist release of the clutch until the brake is applied.

3. In a vehicle which has air actuated brakes and a hydraulically actuated power transmission clutch, means including a brake pedal for controlling a supply of air under pressure to the brakes, a hydraulic circuit including a normally open valve for supplying hydraulic fluid to engage the clutch, air actuated means in communication with said supply of air under pressure to close said valve and effect disengagement of the clutch, an air valve controlling the supply to said normally open valve, a secondary brake pedal normally holding said air valve closed and permitting it to open upon depression of the secondary pedal, means to effect depression of said first named pedal with the secondary pedal to cause release of the clutch and application of the brake, and means operable upon release of the pedal to impede the release of air pressure from the brake until the clutch is engaged.

4. In a vehicle which has air actuated brakes and a hydraulically actuated power transmission clutch, means including a brake pedal for controlling a supply of air under pressure to the brakes, a hydraulic circuit including a normally open valve for supplying hydraulic fluid to engage the clutch, air actuated means in communication with said supply of air under pressure to close said valve and effect disengagement of the clutch, an air valve controlling the supply to said normally open valve, a secondary brake pedal normally holding said air valve closed and permitting it to open upon depression of the secondary pedal, means to effect depression of said first named pedal with the secondary pedal to cause release of the clutch and application of the brake, means operable upon release of the pedal to impede the release of air pressure from the brake until the clutch is engaged, said last named means comprising a check valve to interrupt flow of air pressure from the brakes with a restricted orifice therein.

5. In a vehicle which has fluid actuated brakes and a fluid actuated power transmission clutch, means including a brake pedal for controlling a supply of fluid under pressure to the brakes, a fluid circuit including a normally open valve for supplying fluid to engage the clutch, fluid actuated means in communication with said supply of fluid under pressure to close said valve and effect disengagement of the clutch, a second valve controlling supply of fluid to said normally open valve, a secondary brake pedal normally holding said second valve closed and permitting it to open upon depression of said secondary pedal, and means to effect depression of said first named pedal with the secondary pedal to cause release of the clutch and application of the brake.

References Cited in the file of this patent

UNITED STATES PATENTS

| | | |
|---|---|---|
| 2,535,300 | LeTourneau | Dec. 26, 1950 |
| 2,786,368 | Cook | Mar. 26, 1957 |
| 2,814,371 | Bolster et al. | Nov. 26, 1957 |
| 2,883,015 | Schroeder | Apr. 21, 1959 |
| 2,904,146 | Codlin | Sept. 15, 1959 |
| 2,917,143 | Jenney | Dec. 15, 1959 |
| 2,972,906 | Schroeder | Feb. 28, 1961 |
| 2,990,925 | Bernotas | July 4, 1961 |